United States Patent [19]

Koike

[11] Patent Number: 4,694,444

[45] Date of Patent: Sep. 15, 1987

[54] RECORD DISC REPLACING MEANS

[75] Inventor: Eishi Koike, Sagamihara, Japan

[73] Assignee: Ozen Corporation, Tokyo, Japan

[21] Appl. No.: 895,958

[22] Filed: Aug. 13, 1986

[30] Foreign Application Priority Data

Aug. 31, 1985 [JP] Japan .................................. 60-192330

[51] Int. Cl.$^4$ .......................... A63H 3/33; G11B 3/00
[52] U.S. Cl. ...................................... 369/65; 369/63; 369/67; 369/194
[58] Field of Search ...................... 369/63, 65, 66, 67, 369/194

[56] References Cited

U.S. PATENT DOCUMENTS

| 3,648,385 | 3/1972 | Barlow et al. | 369/194 |
| 3,782,733 | 1/1974 | Watanabe | 369/194 |
| 3,799,556 | 3/1974 | Watanabe | 369/63 |
| 3,825,268 | 7/1974 | Holland et al. | 369/65 |
| 4,123,065 | 10/1978 | Watanabe | 369/63 |
| 4,574,370 | 3/1986 | Koike | 369/65 |

Primary Examiner—Steven L. Stephan
Attorney, Agent, or Firm—Basile Weintraub Hanlon

[57] ABSTRACT

A slit for inserting a record disc is formed through a casing of a selective play type of sound reproduction device and made parallel to a record disc carrying face of a turn table inside the casing. A sound transmitting member carries a pair of stylus force releasing projections disposed at the inlet portion of the slit. Within the casing, a centering projection is positioned and resiliently supported near the center of the slit. Both the centering projection and the stylus force releasing projections extend to intersect the slit. A resiliently protruding record disc locking projection is disposed on the record disc carrying face, while the record disc is formed to have a notch engageable with the record disc locking projection.

3 Claims, 8 Drawing Figures

RECORD DISC REPLACING MEANS

BACKGROUND OF THE INVENTION

Field of the Invention

This invention relates to a record disc replacing means for a selective play type of sound reproduction device. More particularly, this invention relates to a record disc replacing means wherein there is provided a slit for inserting a record disc extending through the casing itself of the device.

Heretofore, there have been various sound reproduction devices which employ a record disc containing thereon a plurality of grooves, each of which groove has a starting and stopping point defining a recorded piece. Most of them were conceived by and applied for as patent applications by the present inventor. Specifically there have been ones provided with record disc replacement capability by means of using an open and closing type of record disc holder and with recorded item selectivity by use of selection poles (Japanese Patent Publication No. SHO 56(1981)-53819, Laid-open Patent Publication No. SHO 56(1981)-130808, U.S. Pat. No. 4,373,177, U.S. Pat. No. 838,808 and Japanese Patent Application No. SHO 59(1984)-25860).

However, among these prior art devices of the replaceable disc type and, particularly, those which utilize an open and close type of record disc holder for replacing record discs and selecting poles for selective reproduction, respectively, the cover must be opened each time a record disc is changed. These prior art devices are of two types. Either the cover of the casing is opened to expose the turn table when changing record discs or a record holder is swingably attached to the casing and the holder is opened or closed each time the record disc is changed.

In the former type, placement and removal of the record disc is troublesome. The latter presents the difficulty of opening and closing the record holder.

In view of the problems encountered in the prior art devices, it would be desirable to provide a device in which replacement of record discs is done merely by inserting a desired record disc having a plurality of record grooves thereon into a slit formed in the casing of the device, at the same time performing selective sound reproduction by using selection poles.

Accordingly, an object of the present invention is to provide a selective playing sound reproduction device of the type in which record discs can be changed, where any desired recorded items may be played merely by the user depressing the selection poles. This object can be achieved merely by inserting the desired record disc into the slit provided through the casing of the reproducing device.

SUMMARY OF THE INVENTION

According to the improvement constituting the present invention, a slit for inserting a record disc extending from one side of the casing to the other side thereof is formed parallel to the record carrying face of the turn table. A sound transmitting member carries a stylus force releasing projection.

In the casing, there is disposed a resilient supported centering projection. The stylus force releasing projection carried by the sound transmitting member is located at the inlet portion of the slit for inserting a record disc, and the centering projection is located inside the slit in such a manner that each of them intersects the slit for inserting record disc. The record carrying face of the turn table is provided with a record disc locking projection which projects above the surface of the turntable and the record disc is formed to have a notch engageable with the aforesaid record disc locking projection.

Accordingly, if a record disc is inserted into the slit, the inserted record disc first raises the sound transmitting member by pushing the stylus force releasing projection and then releases the imparted stylus force through the pickup and lets the pickup return to the starting point of sound reproduction. This allows the power source to supply power to the motor for rotating the turn table. The record disc is centered by the centering projection when the record disc is fully inserted into the slit. In addition, the notch cut in the record disc engages the record disc locking projection to render the record disc and the turn table integral in their direction of rotation.

The record disc rotates together with the turn table. The pickup will engage only the recorded groove selected for reproduction. When reproduction of the item finishes, the power to the motor rotating the turn table is cut off.

Depression of any one of the selection poles will release the stylus force again, resulting in the return of the pickup back to the starting point of sound reproduction accompanied by the supply of power to the motor, thereby causing integral rotation of the turn table and the record disc. At this moment, while the selection pole is still being depressed, a stopper projecting from the side periphery of the turn table will strike the selection pole being depressed and temporarily stop the turn table. Subsequent release of the depressed selection pole allows the pickup to be supplied with stylus force. The stopper is released by the selection pole and the turn table is allowed to rotate. In this way, the pickup is allowed to engage the selected recorded groove by use of the specific selection pole.

DETAILED DESCRIPTION OF THE PREFERRED EMBODIMENTS

Figure 1:
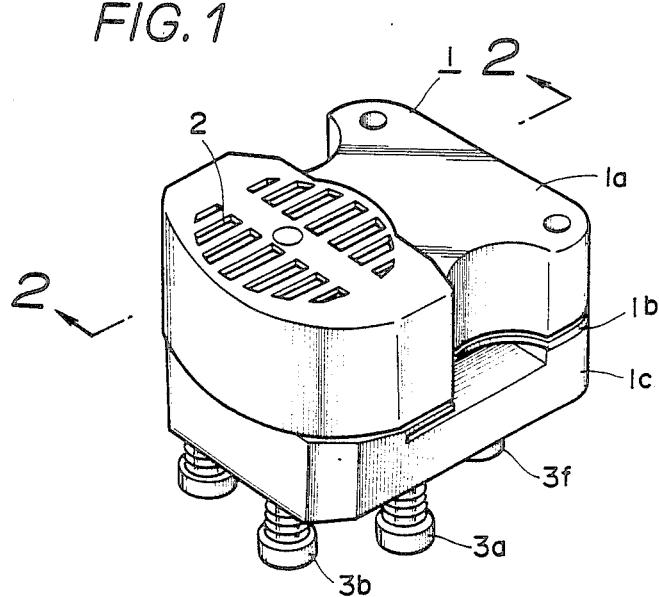
FIG. 1 is a perspective view of a sound reproducing device in accordance with the present invention.
Figure 2:
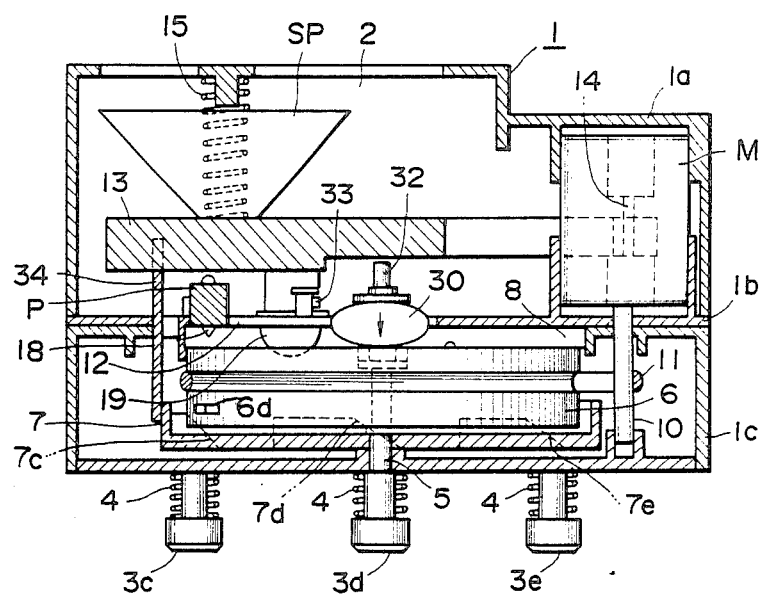
FIG. 2 is a sectional view taken along line 2—2 of FIG. 1.
Figure 3:
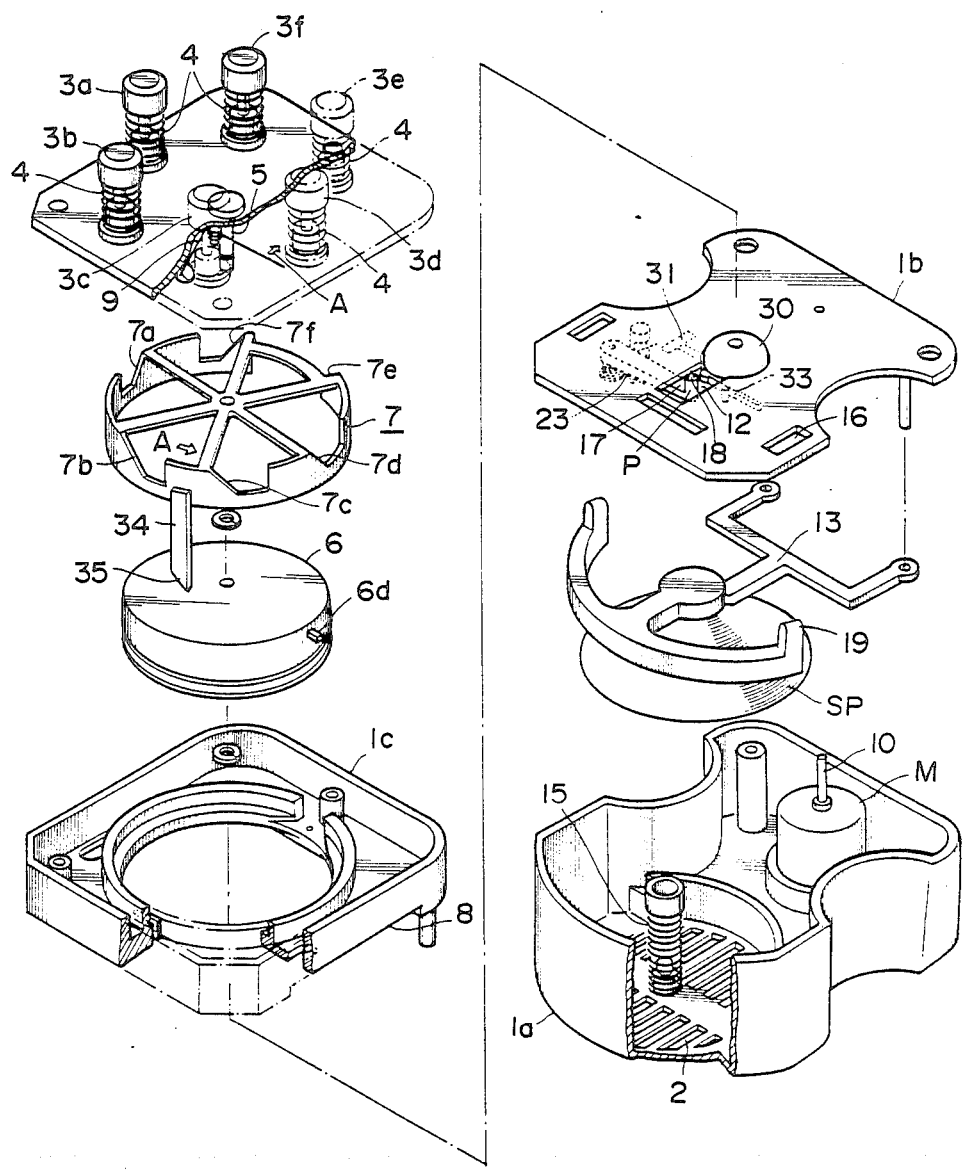
FIG. 3 is a blown up perspective view of the device of FIG. 2 rotated 180°.

FIGS. 1, 2 and 3 show an embodiment of the device of the present invention. According to the drawings, a casing 1 of the device consists of a housing 1a at the upper part thereof, a chassis plate 1b disposed immediately below the housing 1a and a base box 1c disposed further below the chassis plate 1b. Formed in the housing 1a is a speaker box 2, within which a speaker diaphragm SP is received.

Six selection poles, 3a, 3b, 3c, 3d, 3e and 3f project from the base box 1c, as particularly shown in FIG. 3, so that they can be depressed into the interior of the casing 1. Each of these selection poles 3a, 3b, 3c, 3d, 3e and 3f is normally biased outward by respective coil springs 4 which are mounted in a compressed state to the neck of each selection pole.

There is disposed within the base box 1c a center pin 5 standing upright, around which a turn table 6 and a stylus force releasing ring 7 are mounted so as to permit free rotation thereof.

Disposed between the base box 1c and the chassis plate 1b is slit 8 for inserting a record disc. Slit 8 extends from one side to the other side of the casing 1 thereby defining openings in two sides of casing 1. Slit 8 also extends parallel to and communicates with the record disc carrying face of the turn table 6.

Figure 4:
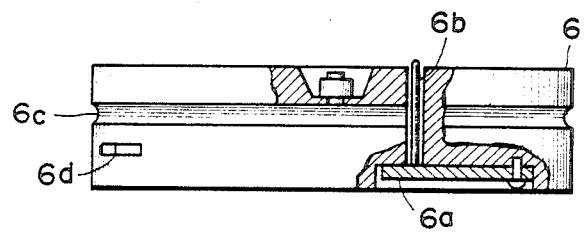
FIG. 4 is a partly cut-away side view of a turn table.

As shown in FIG. 4, the turn table 6 carries on a portion of its record disc carrying face a projection 6b for locking the record disc the projection 6b is resiliently supported on its reverse face by a leaf spring 6a. The location of the projection 6b for locking the record disc to the record disc carrying face of the turn table 6 is adjacent to the central part of the turn table. In addition, the tip end of the projection 6b is formed to have a spherical surface. There are also provided around the peripheral side face of turn table 6 a pulley groove 6c and a stopper 6d.

Figure 5:
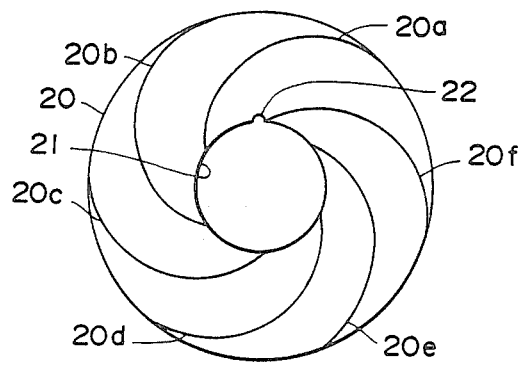
FIG. 5 is a plan view of a record disc.
Figure 6:
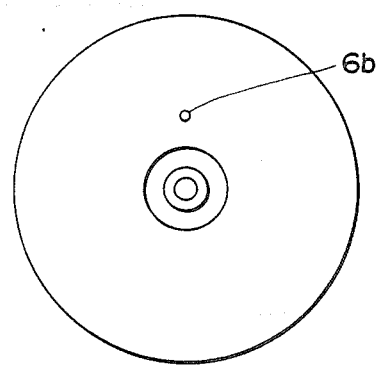
FIG. 6 is a plan view of a turn table.

A record disc 20, is shown in FIG. 5, is inserted through the slit 8 and is placed on the record disc carrying face of the turn table 6. Record disc 20 has six record grooves 20a, 20b, 20c, 20d, 20e and 20f thereon, and further comprises a centering opening 21 for centering the record disc and a notch 22 at a part of the inner periphery of the opening 21 for engagement with the projection 6b to lock the record disc to the turn table 6.

As clearly shown in FIG. 3, an axially oriented stylus force releasing ring 7 comprises inclined faces 7a, 7b, 7c, 7d, 73 and 7f corresponding in number to the selection poles 3a, 3b, 3c, 3d, 3e and 3f. The above-mentioned selection poles 3a, 3b, etc., are arranged to strike against these inclined faces 7a, 7b, etc.

Aforesaid selection poles 3a, 3b, etc., are arranged so that, when depressed against the biasing of the coil spring 4 they urge the corresponding inclined faces 7a, 7b, etc., and thereby rotate the stylus force releasing ring 7. They are also positioned so as to intersect the plane in which the stopper 6d rotates. On the bottom of the base box 1c, a spring 9 is positioned for urging the stylus force releasing ring 7 in the direction in which the inclined faces 7a, 7b, etc. face. Spring 9 engages the stylus force releasing ring 7 in the direction shown by the arrow line A, as particularly shown in FIG. 3.

Accordingly, the operator's depression of any one of the selection poles 3a, 3b, etc., and its corresponding inclined face 7a, 7b, etc., will result in rotation of the stylus force releasing ring 7 against the biasing force imparted by the spring 9.

A motor M is mounted on the chassis plate 1b, the output shaft 10 of which, as shown in FIG. 2, passes through the chassis plate 1b and the upper plate of the base box 1c and extends further to a position where it faces pulley groove 6c. In FIG. 2, 11 is a belt which extends between the output shaft 10 and the groove 6c of the turn table 6 thereby connecting them.

Though not depicted in the drawings, the means of coupling between the output shaft and the turn table may be a frictional engagement such as a rim drive means.

Formed through the chassis plate 1b are an aperture 12 for receiving both a centering projection 17 and a pickup P, and a pair of oblong holes 16 at opposite sides of chassis plate 1b, which holes 16 permit passing a related component through the base box 1c and further intersect the slit 8.

A sound transmitting member 13 formed to have an anchor-shaped forward portion and a bifurcated rear portion, attached with a pair of attaching legs, is disposed above the chassis plate 1b by means of a pair of supporting posts 14.

On sound transmitting member 13, a speaker diaphragm SP is fixedly carried. In FIG. 2, 15 is a stylus force spring compressed between the inner face of the speaker box 2 defined in the housing 1a and the speaker diaphragm SP. Stylus force spring 15 biases the free end of the sound transmitting member 13 toward the record carrying face of the turn table 6.

A centering projection 17 provided with a pickup P at its forward tip end is swingably attached to the chassis plate 1b. This tone arm 17 is biased at its swingable attachment point by a return spring 23 so that the pickup P can normally be directed to the starting point of sound reproduction on the record disc 20. In FIGS. 2 and 3, 18 is a sound reproduction stylus disposed on the under surface of pickup P. The pickup P is disposed through the aperture 12 to extend to the recording face of the record disc 20 so that the sound reproduction stylus 18 can engage the recording face of the record disc 20. Further, the stylus 18 contacts the record face when urged by the sound transmitting member 13.

A pair of stylus force releasing projections 19, each tip end of which is formed to have a rounded shape in cross section, is disposed on each of the two hook portions of the anchor shaped part of the sound transmitting member 13.

Also on the chassis plate 1b, a disc like centering projection 30 with its upstanding face formed as a part of a sphere and directed toward the center of the device, is disposed and supported so as to be resiliently advanced to the level of slit 8.

Aforesaid stylus force releasing projections 19 can extend into the interior of the base box 1c by passing through the oblong holes 16 and the space defined by slit 8. However, the rounded tip end portion of each releasing projection 19 is still retained within the space defined by slit 8.

The centering projection 30 extends to slit 8 in such a manner that the center thereof coincides with the center of the turn table 6. Its opposite face has a pushing pole 32 which impinges upon the lower face of the sound transmitting member 13 when the centering projection 30 is raised upward by the record disc 20.

Thus, the record disc 20 raises the stylus force releasing projections 19, thereby raising the sound transmitting member 13 to prevent the pickup P from receiving any stylus force until record disc 20 has been centered on the turn table 6.

As soon as the record disc 20 passes over the stylus force releasing projections 19 and has been positioned on the center of the turn table 6, the centering projection 30 enters into the centering hole 21 of the record disc 20. If record disc 20 is moved away from the centering projection 30, the record disc 20 will raise the centering projection 30, by means of the inner periphery of centering hole 21, and further raise the sound transmitting member 13 by means of the pusher pole 32 so that no stylus force is applied to the pickup P.

Shown, particularly by a numeral 33 in FIGS. 2 and 3, is a switch contact to the power source for the motor M, which is disposed on the chassis plate 1c at a location corresponding to the end point of sound reproduction of the record disc 20 after the record disc 20 has been centered on the turn table 6. The contact opens the circuit from the power source when the pickup P has arrived at the end point of sound reproduction.

The numeral 34, shown also in FIGS. 2 and 3, is a stylus force releasing pole fixed at the outer periphery of stylus force releasing ring 7. The tip end of which releasing pole 34 is formed to have an inclined face 35 facing in the direction opposite to that of the inclined faces 7a, 7b, etc., and slidably contacting a side of the sound transmitting member 13 at the central part thereof.

When the stylus force releasing ring 7 rotates, the inclined face 35 of the stylus force releasing pole 34 will raise the sound transmitting member 13 so that stylus force cannot be applied to the pickup P.

Next, the operation of this embodiment will be explained.

A record disc 20 is inserted through the slit 8 while a main switch, not shown, is kept in the OFF position.

The record disc 20 will raise the stylus force releasing projection 19 by means of the rounded tip end, and this stylus force releasing projection 19, will raise the sound transmitting member 13 and release the stylus force applied to the pickup. The pickup will retract from the plane in which the recorded face of the record disc is situated.

When the record disc 20 is fully inserted into slit 8, the centering projection 30 will be fully received by the centering hole 21 of the record disc. The record disc 20 will no longer raise stylus force releasing projection 19. If a main switch, not shown, is turned ON, the turn table 6 will start to rotate. If the notch 22 formed on the record disc 20 is not engaged with the record disc locking projection 6b, then both members will move in the same direction of rotation until the record disc locking projection 6b eventually engages the notch 22. Then the record disc 20 becomes integral with the turn table 6 and rotates with it. As long as the record disc 20 continues to rotate, the reproduction stylus 18 of the pickup P will engage any one of the recorded grooves 20a, 20b, etc., and reproduce the item recorded in that groove until it reaches the end point of sound reproduciton. At that point, the pickup P will encounter the switch contact 33, and the power source to the motor M will be cut off, allowing both the turn table 6 and the record disc 20 to stop their rotation.

Since the locations of the introductory parts of the record grooves 20a, 20b, etc., have been fixed by means of the locking projection 6b and the notch 22 so as to correspond to each of the selection poles 3a, 3b, etc., the operator who wants to reproduce one of the specific recorded grooves has only to push the specific selection pole corresponding to that item. Then the inclined face 7a, 7b, etc., which corresponds to the pushed selection pole is urged and the stylus force releasing ring 7 will rotate, which, in turn, will rotate the stylus force releasing pole 34, and raise the sound transmitting member 13 and release the stylus force exerted on the pickup P.

In this way, the pickup P will revert back to the starting point of sound reproduction urged by the resilient force given by the return spring 23. At the same time, the switch contact 33 has lost the support given by the pickup P and is turned ON, permitting the turn table and the record disc 20 rotate. If any one of the selection poles, 3a, 3b, etc., remains depressed from the time of starting, the stylus force releasing ring will maintain its rotated position and the stylus force releasing pole 34 will maintain the sound transmitting member 13 in its raised position. Since no stylus force is applied to the pickup P, the turn table and the record disc will continue rotation until the stopper 6d strikes the selection pole in its depressed state.

When the stopper 6d strikes the depressed selection pole, the turn table 6 and the record disc 20 will be tentatively locked. Until this happens, slippage between the turn table 6 and the belt 11 occurs. The introductory part of the record groove, selected during the phase of rotation of this tentative locking of the turn table 6 and the record disc 20, is positioned at the location onto which the pickup P descends to engage therewith.

Subsequent release of the selection pole allows the stylus force releasing ring 7 to revert back to the original phase of rotation by means of the force given by the spring 9. The stylus force releasing pole 34 will also return to its original position. Accordingly, the sound transmitting member will advance, urged by the stylus force spring 15 due to the absence of support, thereby allowing the pickup P to descend onto the recorded face of the record disc 20 to apply necessary stylus force thereon. At the same time, the stopper 6d will also be released from the support given by the selection pole, thereby allowing the turn table 6 and the record disc 20 to rotate.

In the manner as explained above, upon completion of the reproduction of the desired item, the pickup P advances up to the end point of sound reproduction and causes the switch contact 33 to cut off power to the motor M, thereby stopping both the turn table 6 and the record disc 20.

Figure 7:
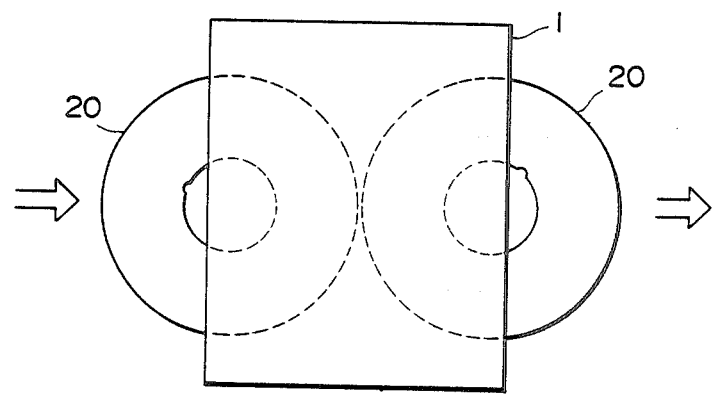
FIGS. 7 and 8 are plan views showing the manner of replacing record discs.
Figure 8:
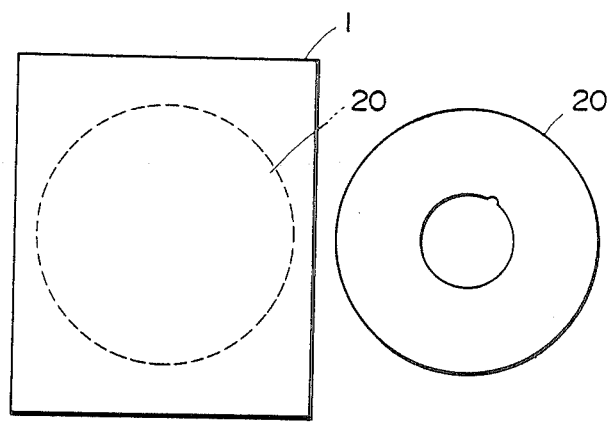

FIGS. 7 and 8 show how to replace the second disc 20 with another one. That is, if another record disc 20 is inserted into slit 8 from one side thereof (left side in FIG. 7), the previous record disc is pushed out by the newly inserted record disc until it is fully discharged and replaced by the newly inserted record disc, as shown in FIG. 8.

I claim:

1. A record disc replacing means for use in a selective reproduction type of sound reproduction device, comprising:

a casing;

a turn table disposed inside the casing capable of changeably carrying a record disc on a face thereof, said record disc having a plurality of recorded grooves thereof and a centering hole at the center thereof; said plurality of recorded grooves each having a starting and stopping point of sound reproduction;

a pickup normally biased toward the starting point of sound reproduction;

a sound transmitting member which carries a speaker diaphragm and resiliently contacts said pickup to impart stylus force thereto;

a plurality of selection poles corresponding in number to that of said recorded grooves, said plurality being disposed around the outer periphery of said turn table;

a stopper radially and outwardly projecting from the outer periphery;

a motor; whereby depression of any one of said plurality of selection poles raises said sound transmitting member and releases the stylus force imparted to said pickup and allows it to revert back to the staring point of sound reproduction, while at the same time said depressed selection pole strikes the stopper to temporarily stop said record disc under rotation whereby the starting point of the corresponding groove can stop at a position where said pickup can engage said starting point, and whereby the pickup will engage the switch at the stopping point to turn off the motor;

a power source;

said motor connected to the power source, said motor further comprising an output shaft;

means of coupling the output shaft to the turntable to rotate the turntable and a record disc carried thereon;

a switch engageable with the pickup at the stopping point of sound reproduction to turn off the power source;

a slit for inserting a record disc formed through the casing therein defining two openings on opposite sides thereof parallel with said record carrying face of said turn table;

at least one stylus force releasing projection carried by the sound transmitting member and disposed near one of the two openings of the slit and projecting thereinto;

a centering projection resiliently supported in said casing, and disposed adjacent the center of said slit and projecting thereinto;

a resiliently protruding record disc locking projection carried by the record disc carrying face of said turn table; and a notch engageable with said record disc locking projection disposed on said record disc to lock the record disc to the record disk carrying face.

2. The record disc replacing means of claim 1, wherein said stylus force releasing projection, centering projection and record disc locking projection are formed to have an inclined round face facing toward the advancing direction of said record disc.

3. The record disc replacing means of claim 1 wherein the record disc carried by the turn table can be pushed out of the casing through one of the openings by another record disc being inserted through the other opening for subsequent placement on the turntable.

* * * * *